United States Patent [19]
Sato et al.

[11] Patent Number: 5,322,595
[45] Date of Patent: Jun. 21, 1994

[54] MANUFACTURE OF CARBON SUBSTRATE FOR MAGNETIC DISK

[75] Inventors: Motoharu Sato, Kobe, Japan; Stephen S. Rosenblum, Palo Alto, Calif.

[73] Assignees: Kabushiki Kaisha Kobe Seiko Sho, Kobe, Japan; Kobe Steel USA Inc., New York, N.Y.

[21] Appl. No.: 34,892
[22] Filed: Mar. 19, 1993
[51] Int. Cl.$^5$ .............................................. B44C 1/22
[52] U.S. Cl. .................................. 156/643; 156/626; 156/654
[58] Field of Search ............... 156/643, 654, 664, 626; 204/192.32

[56] References Cited
U.S. PATENT DOCUMENTS 4,802,951  2/1989  Clark ........................... 156/643 X
5,006,203  4/1991  Purdes ........................... 156/646
5,022,959  6/1991  Itoh et al. ....................... 156/643
5,166,006  11/1992  Lal et al. ....................... 156/656 X Primary Examiner—William Powell
Attorney, Agent, or Firm—Oblon, Spivak, McClelland, Maier & Neustadt

[57] ABSTRACT

Disclosed is a method of manufacturing a carbon substrate for a magnetic disk capable of increasing the treatment rate leading to a lowering of the manufacturing cost, reducing the variation of the surface roughness of each substrate, and the variation of the surface roughness among the substrates in each lot. The surface of a carbon substrate is roughened to have a surface roughness Ra of 10-500 Å by dry etching. The examples of the dry etching methods include chemical dry etching, barrel etching, plasma etching, RIE, RIBE, and ion milling.

4 Claims, 3 Drawing Sheets

MANUFACTURE OF CARBON SUBSTRATE FOR MAGNETIC DISK

BACKGROUND OF THE INVENTION

1. Field of the Invention

The present invention relates to a method of manufacturing carbon substrates for magnetic disks for data storage including a texture treatment process of roughening the surfaces of the carbon substrates, and particularly to a texture treatment process for carbon substrates which is applicable to manufacturing magnetic disks with low static friction or stiction to the magnetic heads.

2. Description of the Related Art

Recently, with an increase in the amount of information to be recorded, there have been strong demands on magnetic disks as external recorders with large storage capacity and high recording density.

For improvement of the recording density from the viewpoint of the magnetic head, the decrease in the flying height of the magnetic head is effective to obtain high density. However, to reduce the flying height of the magnetic head, the substrate is required to meet severe requirements in flatness and surface roughness. At the present time, flying height of 0.3 μm or less is necessary for achieving high density recording. In this case, the surface roughness required for the substrate is one-tenth or less of the flying height.

However, for the surfaces of the commonly used aluminum alloy substrates themselves, it is impossible to obtain such a low surface roughness. NiP/Al substrates have been used for the t in-film media wherein the surfaces of the aluminum alloy substrates are plated with electroless NiP films for hardening the surfaces and reducing the defects. Surface roughness can be reduced by using this NiP/Al substrate.

On the other hand, if the surface roughness is excessively reduced, there occurs a problem that the magnetic head is attracted to the magnetic disk surface. This attraction phenomenon is based on the following cause: namely, when the slider surface of the magnetic head and the magnetic disk surface, which are finished to be extremely smooth, are opposed to each other with a micro-gap, the gap is buried by the molecules of $O_2$, $N_2$, $H_2O$ and the like, to thereby generate a large attracting force due to the viscous forces and Vander Waals forces. The above attracting force causes the consumption of a large electric power at the starting of the motor, and further, in the worst case, causes damage to the magnetic head or magnetic disk. As a method of preventing such an attraction phenomenon, for the purpose of reducing the contact area between the slider surface of the magnetic head and the magnetic disk surface, there has been commonly adopted a texture treatment process of controlled roughening of the surface of the substrate. However, the roughening of the surface of the NiP/Al substrate by machining i difficult because of generation of the burrs peculiar to metal. Accordingly, achievement of low flying height of the magnetic head using the NiP/Al substrate i difficult. Further, for improvement of the magnetic characteristic, deposition at higher substrate temperature is preferable, but there occurs a problem due to the magnetization generated by the crystallization of the amorphous NiP at high temperatures.

Various substrates in place of the NiP/Al substrate have been proposed. One arrangement relates to use of a carbon substrate for the magnetic disk, which has the features of high heat resistance, non-magnetic property, lightweight and the like (Sato, and others; Abstract of 37th Associated Meeting of Japan Society of Applied Physics, No. 29a-Y-8, 1990).

In a known texture treatment process of the carbon substrate for the magnetic disk, a carbon substrate after surface polishing is heated at 400°–700° C. in an oxidizing atmosphere (Japanese Patent Laid-open No. hei 3-283018).

The above problems can be all solved by using the carbon substrate subjected to uniform surface roughening. Namely, by surface roughening of the carbon substrate, the attraction between the magnetic disk surface and the magnetic head is reduced and the generation of burrs observed in the NiP/Al substrate is eliminated, which enables the low flying height performance of the magnetic head. Further, since the carbon substrate has a high heat resistance, it is possible to improve the medium performance, and hence to manufacture the magnetic disk with high recording density.

However, the conventional roughening method of heating the carbon substrate after surface polishing a 400°–700° C. in an oxidizing atmosphere is disadvantageous since it increases the manufacturing cost because of its longer treatment time. Also, since the temperature control is difficult, the surface roughness is locally varied in each substrate, thereby generating a variation of the surface roughness in the surface of each substrate, and generating a variation of the surface roughness among the substrates in each lot.

SUMMARY OF THE INVENTION

Taking the above circumstances into consideration, the present invention has been made, and its object is to provide a method of manufacturing a carbon substrate for a magnetic disk capable of increasing the treatment rate to lower the manufacturing cost, reduce the variation of the surface roughness in the surface of each substrate, and the variation of the surface roughness among the substrates in each lot.

In the method of manufacturing the carbon substrate for the magnetic disk according to the present invention, the feature lies in roughening the surface of the carbon substrate by dry etching.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

In the present invention, the surface of the carbon substrate is subjected to texture treatment by dry etching for roughening the surface of the carbon substrate. Examples of dry etching methods include chemical dry etching (CDE), barrel etching, plasma etching, reactive ion etching (RIE), reactive ion beam etching (RIBE), ion beam milling and the like. The above methods are applicable as concrete means for the texture treatment. In the above methods, the etching rate is variable depending on the flow rate of the used gas, treatment pressure, discharge power and the like, thereby making it possible to control the surface roughness.

In addition, when the surface roughness, Ra, of the carbon substrate roughened by dry etching is less than 10 Å, an attraction of the head is generated. Also, when the surface roughness Ra is more than 500 Å, the flying height of the head is unstable because of the excessively roughened surface. Accordingly, the surface roughness obtained by the texture treatment using dry etching is preferably within the range from 10 to 500 Å.

The present invention will be more apparent by way of the following examples.

EXAMPLE 1

First, a method of preparing a substrate for a magnetic disk will be described. A phenol-formaldehyde resin, being a thermosetting resin, is transformed into a glassy carbon after carbonizing/burning and is hot-pressed in the shape of a specified disk. After that, the above hot pressed resin is pre-carbonized by heating at a temperature of 1500° C. in a nitrogen gas atmosphere. Next, it is mounted on a hot isostatic press (HIP), and is subjected to HIP treatment under the condition of a temperature of 2600° C. and an isostatic pressure of 1800 atms. Thus, a formed product for the carbon substrate made of vitreous carbon can be obtained. The formed product thus obtained is further processed with the specified edge preparation and polished to a mirror-like finish, to thus prepare a carbon substrate for a magnetic disk having a surface roughness Ra of about 10 Å and a diameter of less than 3.5 inches.

After that, the texture treatment is carried out by plasma etching under the following condition.
 Apparatus used: A304 (cathode type) sold by Plasma System Co., Ltd.
 Distance between electrodes: 50 mm
 Gas flow rate (kind): 20 sccm (O$_2$)
 Treatment pressure: 100 mTorr
 Power: 13.56 MHz power 100 W
 Substrate temperature: 20° C.

Figure 1:
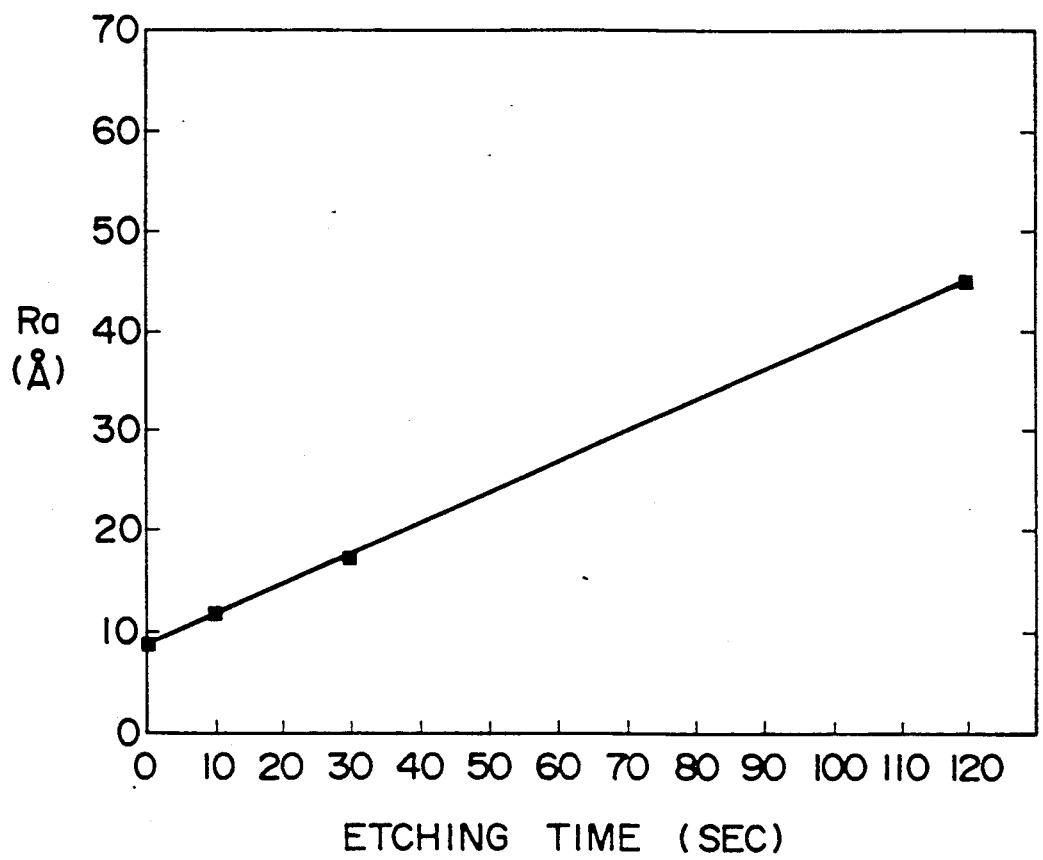
FIG. 1 is a graph showing a relationship between the etching time and the surface roughness.

After texture treatment, the surface roughness of the carbon substrate was measured by a surface roughness tester. The result is shown in FIG. 1. FIG. 1 is a graph showing a relationship between the etching time and the surface roughness, wherein the abscissa indicates the etching time (sec) and the ordinate indicates the surface roughness Ra (Å).

As is apparent from this figure, the variation of the surface roughness at each portion is extremely small and burrs are not generated, that is, the surface is uniformly roughened. Further, using the carbon substrate uniformly roughened to Ra=40 Å by the above method, a Cr layer of 3000 Å, Co$_{62.5}$Ni$_{30}$Cr$_{7.5}$ layer of 600 Å, and a C layer of 300 Å were respectively formed thereon by an in-line type D.C. magnetron sputtering system. For evaluation of the attraction characteristic of the magnetic head, the magnetic head was disposed on the magnetic disk, which were held in a high temperature and high humidity condition (65° C., 85% humidity, 10 days). After that, the attraction test was carried out. At this time, the film formation was similarly made on a polished substrate which was subjected to the attraction test.

As a result, for the polished substrate, there is generated the attraction of the magnetic head; however, for the substrate uniformly roughened by plasma etching, there is not generated the attraction of the magnetic head.

As is apparent from FIG. 1 and the result of the attraction test for the substrate being subjected to the texture treatment of the present invention, it is possible to uniformly and accurately control the surface roughness by the treatment time or other treatment condition, and to reduce the generation of the attraction of the magnetic head.

EXAMPLE 2

There was manufactured a carbon substrate for a magnetic disk having a surface roughness Ra of about 10 Å and a diameter of 2.5 inches in the same manner as in Example 1.

Figure 2:
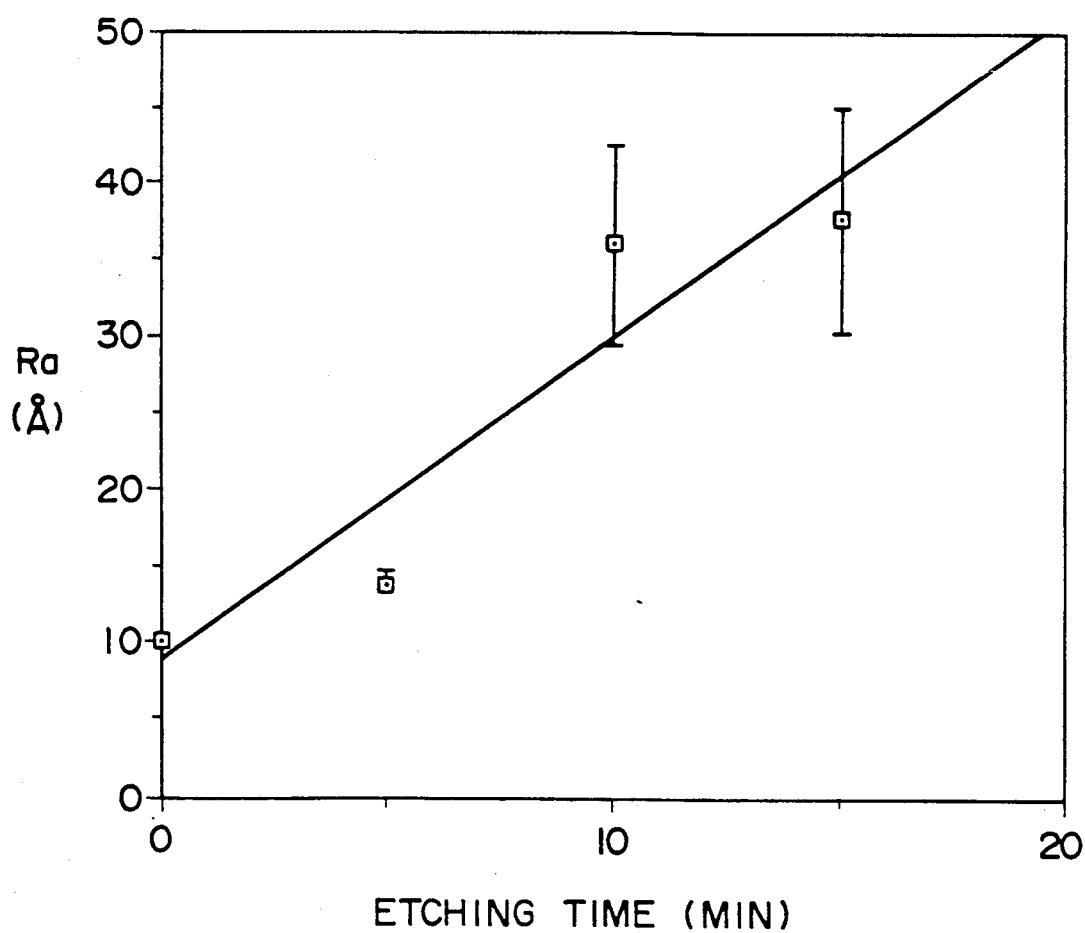
FIG. 2 is a graph showing a relationship between the etching time and the surface roughness.

After that, the texture treatment was carried out by plasma etching under the following condition.
 Apparatus used: SIH-S100 sputtering equipment sold by ULVAC Co., Ltd.
 Distance between electrodes: 30 mm
 Gas flow rate (kind): 20 sccm (O$_2$), 40 sccm (Ar)
 Treatment pressure: 4.5 mTorr
 Power: 13.56 MHz power 400 W
 Substrate temperature: 350° C.
 Treatment time: 5 min, 10 min, 15 min After texture treatment, the surface roughness of the carbon substrate was measured by a surface roughness tester. The result is shown in FIG. 2. FIG. 2 is a graph showing a relationship between the etching time and the surface roughness, wherein the abscissa indicates the etching time (min) and the ordinate indicates the surface roughness Ra (Å). As is apparent from this figure, it is possible to control the surface roughness by adjustment of the treatment time even at a lower pressure than in Example 1. Further, the magnetic disk was manufactured in the same manner as in Example 1, which was subjected to the attraction test. As a result, there was not generated the attraction of the magnetic head.

EXAMPLE 3

There was manufactured a carbon substrate for a magnetic disk having a surface roughness Ra of about 10 Å and a diameter of 3.5 inches in the same manner as in Example 1.

Figure 3:
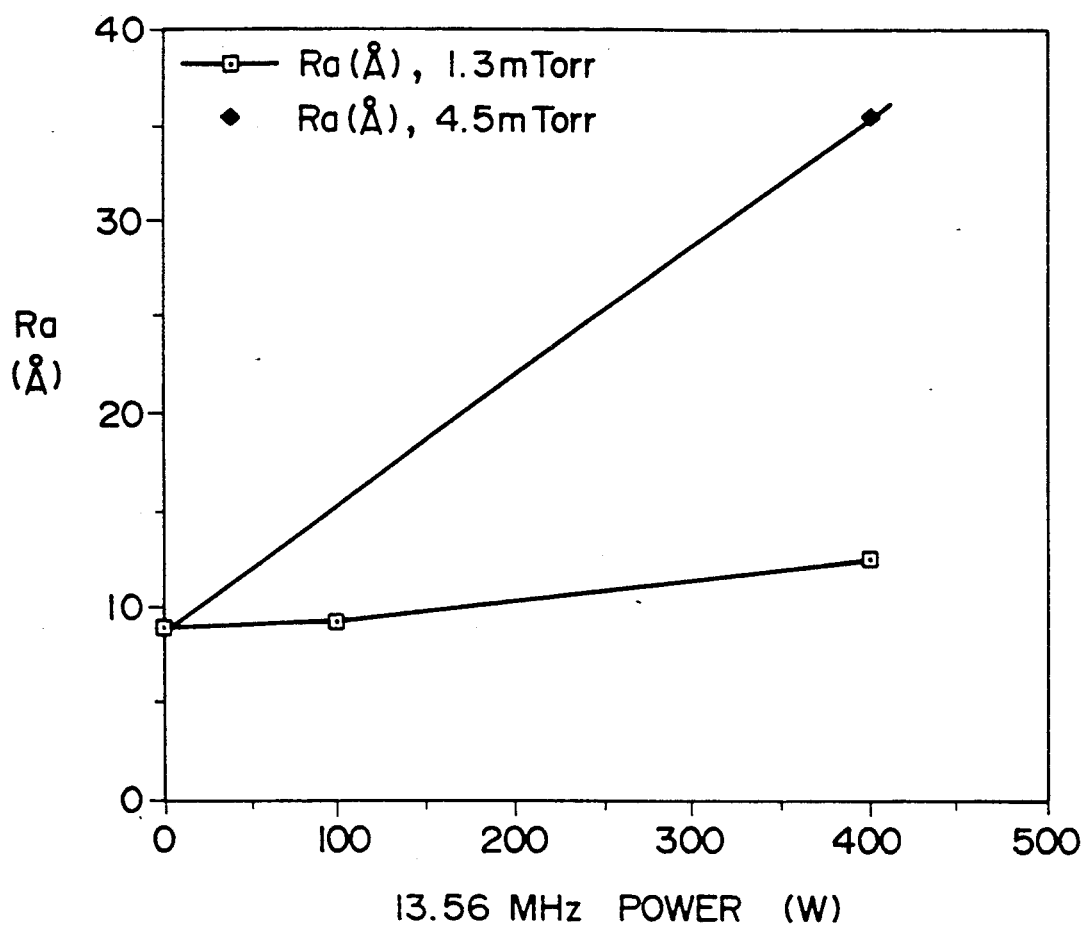
FIG. 3 is a graph showing a relationship between the 13.56 MHz power and the surface roughness.

After that, the texture treatment was carried out by plasma etching under the following condition.
 Apparatus used: SIH-S100 sputtering equipment sold by ULVAC Co., Ltd.
 Distance between electrodes: 30 mm
 Gas flow rate: Ar:O$_2$=50:50
 Treatment pressure: 1.3 mTorr and 4.5 mTorr
 Power: 13.56 MHz power 100 W–400 W
 Substrate temperature: 250° C.
 Treatment time: 30 min After texture treatment, the surface roughness of the carbon substrate was measured by a su face roughness tester. The result is shown in FIG. 3. FIG. 3 is a graph showing a relationship between the high-frequency power and the surface roughness, wherein the abscissa indicates the 13.56 MHz power and the ordinate indicates the surface roughness Ra (Å) when etched at 1.3 mTorr and 4.5 mTorr. As is apparent from this figure, it is possible to control the surface roughness by adjustment of the power and the treatment pressure. Also, it is revealed that the variation of the surface roughness at each portion is extremely small and burrs are not generated, that is, the surface is uniformly roughened. Further, the magnetic disk was manufactured in the same manner as in Examples 1 and 2, and was subjected to the attraction test. As a result, there was no attraction of the magnetic head.

As described above, according to the method of manufacturing the carbon substrate for the magnetic disk of the present invention, it is possible to uniformly apply the texture treatment on the surface of the substrate. Accordingly, in the magnetic disks manufactured by use of such a substrate, the attraction of the magnetic head is eliminated and burrs are not generated, as a result of which the low flying height of the magnetic head can be obtained. This makes it possible to manufacture very high quality substrates for magnetic disks. Further, according to the present invention, the texture treatment can be carried out rapidly, and the cost of the treatment can be reduced.

What is claimed is:

1. A method of manufacturing a carbon substrate for a magnetic disk comprising the step of:
    roughening the surface of a carbon substrate by direct dry etching.

2. A method of manufacturing a carbon substrate for a magnetic disk according to claim 1, wherein a surface roughness Ra of said carbon substrate is adjusted to be 10-500 Å by dry etching.

3. A method of manufacturing a carbon substrate for a magnetic disk according to claim 1, wherein said dry etching is selected from the group consisting of chemical dry etching, barrel etching, plasma etching, RIE, RIBE and ion milling.

4. A method of manufacturing a carbon substrate for a magnetic disk comprising the steps of:
    forming a thermosetting resin to be transformed in a vitreous carbon after carbonizing/burning into a formed product in the shape of a magnetic disk;
    pre-burning said formed product by heating;
    performing an HIP process for said formed product after pre-burning by applying an isostatic pressure thereon while heating it;
    mirror-like polishing the surface of said formed product; and
    roughening the surface of said formed product by dry etching.

* * * * *